United States Patent Office 2,844,486
Patented July 22, 1958

2,844,486

WATER DISPERSIBLE TALC PIGMENT COMPOSITION

Richard S. Lamar, La Canada, Calif., assignor to Sierra Talc & Clay Company, South Pasadena, Calif., a corporation of California No Drawing. Application December 26, 1956
Serial No. 630,447

11 Claims. (Cl. 106—308)

This invention relates to a water dispersible talc pigment composition and to the method of preparing the same.

The mineral talc has long been used for many purposes, including its use as an inert powder for many and varied applications, but its use as a pigment in aqueous media has been much limited because of its inherent properties of being naturally hydrophobic, and therefore most difficult to disperse in aqueous mediums. Furthermore, as customarily prepared, its opacity or obscuring power has been considered small in comparison with other more or less standard pigments, such as titanium oxide, zinc oxide, and calcium carbonate.

I have discovered that water dispersible talc pigments having many desirable properties for use as a paper coating material and for other related uses may be prepared by coating the surfaces of ultra finely divided talc particles with certain nonionic surfactants. I have further discovered that the coating of the ultra fine particles of talc may be most effectively done by disintegrating the talc in the presence of these nonionic surfactants.

It is therefore a principal object of this invention to provide a talc pigment which is readily dispersible in aqueous media, and which has high obscuring or covering power when used in paper coating films, latex paint films, and the like. Another object of the invention is to provide methods for preparing dry talc pigment which is readily dispersible in aqueous media. Still another object is to provide a method for changing naturally hydrophobic talc particles to strongly hydrophilic particles.

Selected high purity talc rock is preferably first pulverized in any suitable grinding mill to about 80 percent through 200 mesh, after which it is milled in a high impact mill such as a hammer mill, preferably one in which the coarser air suspended charge is re-circulated through the hammers, and only the finest particles are removed and collected in cyclone collectors and dust collecting bags or the like. Likewise, these ultra-fine particle size talcs may be prepared by grinding in fluid-energy mills using superheated steam or preheated air as the energizing force. There is also fed into the mill a relatively small proportion of a surfactant material which is intimately interground with the talc, so that the surface of each particle of talc is wholly or partly coated with the surfactant. The surfactant may be fed into the mill in the proper proportion as a dry flake or powder, as a liquid, or as a solution, preferably proportioned and distributed on the talc fed to the mill. In the latter case, the solvent, if in small proportion, may remain in the talc powder, or it may be evaporated out during the milling and air separating operations. The intergrinding of the talc with the special surfactant material results in talc particles whose surface characteristics in relation to water have been completely changed.

The surfactant materials which have been found to be effective in changing the surface characteristic of the talc particles, which are naturally hydrophobic, to hydrophilic, comprise the group of nonionic wetting agents in which the hydrophilic portion consists of ethylene oxide groups, for example "Pluronics," in which a polypropylene glycol base has various proportions of ethylene oxide condensed on it. Other nonionic surfactants in this class are "Igepal CO" (General Aniline and Film Co.); "Tetronics" (Wyandotte Chemicals Corporation); and "Triton" (Rohm & Haas Co.). The proportion of the surfactant required to give maximum hydrophilic properties to the fine talc particles varies to some extent with the surface area of the talc, as well as upon the activity of the particular surfactant. It also depends upon the nature of the talc particles, since the ethylene oxide group type surfactants are believed to attach themselves to the basal surfaces and not at the crystal edges of the talc particles. In general, the optimum surfactant required to overcome the natural hydrophobic character of the talc surface is in the range from 1 to 4 percent based on the weight of the talc.

EXAMPLE 1

Talc rock previously pulverized to a fineness of 80 percent through a 200 mesh screen was further reduced in particle size by passage through a hammer mill equipped with air ducts and air separators to recycle the coarser material through the mill and collection of only the finest particles in a conventional bag house device. "Pluronic" L64, a liquid surfactant consisting of a polyoxypropylene base of molecular weight about 1500 to 1800 on which there has been condensed 40 to 50 percent of polyethylene oxide, was sprayed onto the continuous feed to the hammer mill so that a proportion of about 2 parts by weight to each 100 parts by weight of talc resulted. The fine powdered talc, surface coated with the surfactant, was collected in the collector device. This material was readily dispersed in water, with all talc surfaces readily wet by water, so that slurries of low viscosity and with as high as 55 percent solids resulted.

EXAMPLE 2

Solid "Pluronic" F68 was added in the proportion of 3 percent to the feed to a milling system as described above, the surfactant being in flake form, which was interground with the talc. A similar wettable and dispersible product resulted. "Pluronic" F68 consists of a polyoxypropylene base of molecular weight about 1500 to 1800 on which there has been condensed 80 to 90 percent of polyoxyethylene.

EXAMPLE 3

"Tetronic" 908 may be substituted for the "Pluronic" F68 with similar results.

EXAMPLE 4

"Pluronic" F68 may be substituted for the "Pluronic" L64 of Example 1, with similar but somewhat better results. Nonviscous slurries up to 58 percent solids were produced with "Pluronic" F68.

While the intergrinding of the talc with the surfactant in a high impact mill, as illustrated above, is the preferred method of preparation of my new hydrophilic talc, the already finely ground talc may be treated with aqueous solutions of the wetting agent and then subsequently dried by any suitable means, including spray drying. The dry milling process requires only about 75 percent of the surfactant to give optimum hydrophilic properties, in comparison with the wet process disclosed below in Example 5.

EXAMPLE 5

"Pluronic" F68 was applied to the surfaces of previously finely ground talc by making a slurry of the talc in a water solution containing wetting agent to the extent of 2.5 percent based on the talc content. The slurry was then dried out, and the powder remilled in an impact mill to break up the aggregates. The product is a hydrophilic talc which is readily wet by water, and can be made into a slurry having up to 55 percent solids without appreciable increase in viscosity. "Pluronic" F68 is a high molecular weight surfactant product of which the base is polyoxypropylene with 80 to 90 percent polyoxethylene in the molecule.

The talc particles in all products of the above examples were ultra fine, being substantially all finer than 6 microns in spherical diameter equivalents. The surface area as determined by the nitrogen adsorption method (Brauner, Emmett and Teller, "Journal American Chemical Society," vol. 60, page 309, 1938) varied from 3.7 to 25.1 square meters per gram. The percent of surfactant or wetting agent for optimum wetting of the talc surfaces by water is related to the surface area of the talc, as illustrated in the following Table I:

Table I

| Talc grade | % Pluronic F68 required | Surface area by B. E. T. nitrogen adsorption |
| --- | --- | --- |
| Trinity Superfine | 0.8 | 3.7 square meters per gram |
| Mistron HGO-55 | 2.3 | 15.1 do |
| Mistron 18 | 2.5 | 18.1 do |
| Mistron 25 | 3.0 | 25.1 do |

The dispersion of the surface treated talc products of the above examples is greatly facilitated by the presence also of an anionic dispersing agent such as a polyphosphate, for example, potassium tripolyphosphate, sodium pyrophosphate, sodium hexametaphosphate, and the like. Potassium tripolyphosphate is preferred. The anionic dispersant may be added to the feed to the mill and interground with the surfactant agent and the talc, as described in Examples 1 to 4, or it may be subsequently added to the aqueous liquid in which the talc is to be dispersed. The optimum proportion of the tripolyphosphate varies slightly with the amount of the surfactant which is used in the treatment of the talc particle surfaces, but is within the range of 0.5 to 2 percent, based upon the talc content. The addition of the tripolyphosphate greatly improves the dispersion of the surface treated talc made in accordance with this invention. For example, the best dispersion of the product described above in Example 4 is made in the presence of 1.3 percent of potassium tripolyphosphate. Slurries with talc (Mistron HGO-55, see Table I) as high as 65 percent can be prepared, in comparison to 48 percent without the surface treatment and dispersant. The same proportion of the anionic dispersant when interground with the talc and surfactant yields a talc pigment which has high wettability with water and is readily dispersed in aqueous liquids.

The treated talc powders of this invention may be used to great advantage wherever completely water dispersed talc is applicable, such as pigment in emulsion paints, in high solid coatings for paper fiberboard and chipboard; and for textiles.

The advantages of my invention will be apparent from the above description. The new talc pigment of this invention has good hydrophilic properties and may be dispersed in aqueous media without use of a large amount of mechanical dispersing energy which is required when the surfactant is merely added to the aqueous liquid in which the talc is to be dispersed. The product may also be used in much higher solid stable dispersions than can the untreated talc powder, with minimum viscosities and freedom from thixotropy.

I claim:

1. A strongly hydrophilic talc pigment comprising finely comminuted talc particles having their surfaces at least partly coated with a nonionic surfactant having a hydrophobic portion chemically bound to a hydrophilic portion consisting of polyethylene oxide groups.

2. A strongly hydrophilic talc pigment comprising finely comminuted talc particles having their surfaces at least partly coated with a nonionic surfactant having a polypropylene glycol base having ethylene oxide groups condensed thereon to form the hydrophilic portion of said surfactant.

3. A strongly hydrophilic talc pigment comprising finely comminuted talc particles having their surfaces at least partly coated with a nonionic surfactant having a polypropylene glycol base having ethylene oxide groups condensed thereon to form the hydrophilic portion of said surfactant, the weight proportion of said nonionic surfactant to said talc being in the range of 1 to 4 percent.

4. A strongly hydrophilic talc pigment comprising finely comminuted talc particles having their surfaces at least partly coated with a nonionic surfactant having a polypropylene glycol base having ethylene oxide groups condensed thereon to form the hydrophilic portion of said surfactant, and an anionic dispersing agent in a small but effective proportion.

5. A strongly hydrophilic talc pigment comprising finely comminuted talc particles having their surfaces at least partly coated with a nonionic surfactant having a polypropylene glycol base having ethylene oxide groups condensed thereon to form the hydrophilic portion of said surfactant, the weight proportion of said nonionic surfactant to said talc being in the range of 1 to 4 percent, and an anionic dispersing agent in a small but effective proportion.

6. In the process of preparing a water dispersible talc pigment wherein a surfactant effective in aqueous solution is employed, the method comprising comminuting said talc and simultaneously coating at least a portion of the surface of each particle of talc with a nonionic surfactant having a polypropylene glycol base with ethylene oxide groups condensed thereon to form the hydrophilic portion of said surfactant, said nonionic surfactant agent being effective in aqueous solutions, whereby reaggregation of the talc particles is prevented by the presence of said coating and also whereby said surfactant coating will subsequently facilitate the wetting and dispersing of said treated talc particles in aqueous solutions.

7. In the process of preparing a water dispersible talc pigment wherein a surfactant effective in aqueous solution is employed, the method comprising comminuting said talc and simultaneously coating at least a portion of the surface of each particle of talc with a nonionic surfactant having a polypropylene glycol base with ethylene oxide groups condensed thereon to form the hydrophilic portion of said surfactant, the weight proportion of said nonionic surfactant to said talc being in the range of 1 to 4 percent, said nonionic surfactant agent being effective in aqueous solutions, whereby reaggregation of the talc particles is prevented by the presence of said coating and also whereby said surfactant coating will subsequently facilitate the wetting and dispersing of said treated talc particles in aqueous solutions.

8. In the process of preparing a water dispersible talc pigment wherein a surfactant effective in aqueous solution is employed, the method comprising comminuting said talc and simultaneously coating at least a portion of the surface of each particle of talc with a nonionic surfactant having a polypropylene glycol base with ethylene oxide groups condensed thereon to form the hydrophilic portion of said surfactant, said nonionic surfactant agent being effective in aqueous solutions, whereby reaggregation of the talc particles is prevented by the presence of said coating and also whereby said surfactant coating will subsequently facilitate the wetting and dispersing of said treated talc particles in aqueous solutions, and an anionic dispersing agent in small but effective proportion.

9. In the process of dispersing finely divided talc in an aqueous liquid wherein a surfactant effective in aqueous solution is employed, the method comprising the steps of comminuting said talc and simultaneously mechanically coating at least a portion of the surface of each particle of talc with a nonionic surfactant having a polypropylene glycol base with ethylene oxide groups condensed thereon to form the hydrophilic portion of said surfactant agent so that when subsequently mixed with an aqueous liquid, each particle is dispersed therein to form a high solids dispersion and to avoid the reaggregation of talc particles inherent in comminuting talc without the simultaneous coating of each particle of talc with surfactant agent; and then distributing said partly coated comminuted talc in an aqueous liquid.

10. In the process of dispersing finely divided talc in an aqueous liquid wherein a surfactant effective in aqueous solution is employed, the method comprising the steps of comminuting said talc and simultaneously mechanically coating at least a portion of the surface of each particle of talc with a nonionic surfactant having a polypropylene glycol base with ethylene oxide groups condensed thereon to form the hydrophilic portion of said surfactant, the weight proportion of said nonionic surfactant to said talc being in the range of 1 to 4 percent, so that when subsequently mixed with an aqueous liquid, each particle is dispersed therein to form a high solids dispersion and to avoid the reaggregation of talc particles inherent in comminuting talc without the simultaneous coating of each particle of talc with surfactant agent; and then distributing said partly coated comminuted talc in an aqueous liquid.

11. In the process of dispersing finely divided talc in an aqueous liquid wherein a surfactant effective in aqueous solution is employed, the method comprising the steps of comminuting said talc and simultaneously mechanically coating at least a portion of the surface of each particle of talc with a nonionic surfactant having a polypropylene glycol base with ethylene oxide groups condensed thereon to form the hydrophilic portion of said surfactant, the weight proportion of said nonionic surfactant to said talc being in the range of 1 to 4 percent, and an anionic dispersing agent in small but effective proportion, so that when subsequently mixed with an aqueous liquid, each particle is dispersed therein to form a high solids dispersion and to avoid the reaggregation of talc particles inherent in comminuting talc without the simultaneous coating of each particle of talc with surfactant agent; and then distributing said partly coated comminuted talc in an aqueous liquid.

References Cited in the file of this patent

UNITED STATES PATENTS

| | | |
|---|---|---|
| 1,985,067 | Breyer | Dec. 18, 1934 |
| 2,070,177 | Pickett | Feb. 9, 1937 |
| 2,361,059 | Robertson | Oct. 24, 1944 |
| 2,696,444 | Rossin | Dec. 7, 1954 |
| 2,727,827 | Chertkof | Dec. 20, 1955 |